UNITED STATES PATENT OFFICE 2,629,658

SILVER HALIDE EMULSIONS CONTAINING NONDIFFUSING AZO DYES

Joseph A. Sprung, Easton, Pa., assignor to General Aniline & Film Corporation, New York, N. Y., a corporation of Delaware No Drawing. Application August 11, 1948, Serial No. 43,756

8 Claims. (Cl. 95—6)

The present invention relates to silver halide emulsions diffusely colored with non-diffusing azo dyes and which are admirably fitted for the azo dye bleach process.

The usual multi-layer film employed in the silver-azo dye bleach process are prepared by incorporating yellow, magenta, and cyan azo dyes in the blue, green and red sensitive layers respectively. Because the incorporated dyes usually absorb light in the same spectral region as the sensitized emulsions, the film speed is necessarily slower than ordinary "taking film" containing colorless components for production of the desired colored images.

During the preparation and processing of silver-azo bleach out material, it is essential that the dyes do not migrate from their respective layers or otherwise degraded azo dye images will be obtained. It has therefore been found necessary to anchor the azo dyes in the emulsion in a non-diffusing state, and this has usually been done by precipitating acid azo dyes with basic dyestuffs or with strong organic bases such as guanidine and biguanides. Although these methods can be satisfactorily employed for preventing diffusion of the dyestuffs, it has been observed that these basic materials form stable silver complex salts, and frequently displace the optical sensitizing dyes from the silver halide crystal lattice. As a result, the speed of the resulting emulsion is further impaired and the film can be adapted only for making color prints.

U. S. application Serial No. 533,833, filed May 3, 1944, by Duerr, Morreall, and Harsh, describes a method for producing negative printing material containing integral color correction masks. These masks are prepared inter alia by forming a multilayer film, the lowermost layer being sensitive to red and containing a non-diffusing cyan color former, the intermediate layer being sensitive to green and containing a non-diffusing magenta color former and the outermost layer being blue-sensitive and containing a non-diffusing yellow color former. In either the cyan or magenta layer, or both, is incorporated a yellow azo dye which is rendered fast to diffusion by the utilization of precipitating agents. The film is exposed, developed in a primary aromatic amino color developer to produce subtractively colored negatives in the aforesaid layers in situ with silver images, fixed and then subjected to the action of a silver azo dye bleach bath to destroy the azo dyes at the points of the silver image to yield positive azo dye images. This method has been found to suffer from the disadvantage that the precipitating agent present in the photographic emulsions causes desensitization thereof. Because of this the process has not been commercially adopted.

It has now been discovered that the preparation and processing of photographic material by the silver-azo dye bleach method, including the preparation of color correction masks as above, can be greatly improved while avoiding the disadvantages previously referred to by using azo dyes which are rendered fast to diffusion by including therein a substituent group containing an aliphatic chain of at least 8 carbon atoms, thereby making it unnecessary to employ a dye precipitating agent. The azo dyes so substituted bleach completely in situ with the silver image when subjected to a suitable bleaching bath, one of the cleaved portions of the dye diffusing out of the emulsion and into the bleach bath, while the other cleaved portion of the dye which is colorless remains in the film but without impairing the color of the final dye image.

It has been further ascertained that to achieve the latter result it is essential that the long aliphatic chain be attached to the diazonium portion of the dyestuff. If it be attached to the coupling component, then it is the coupling component which remains in the film after cleavage of the dyestuff in the bleaching bath. This portion of the dye, particularly where the coupling components are of the class of sulfonated naphthols (e. g. H-acid derivatives) bearing a long chain acylamino group, has a yellowish cast and imparts to the emulsion a yellow color which tends to cause color distortion. It is for this reason that the position of the long aliphatic chain constitutes a critical feature of the invention.

It is accordingly an object of the present invention to improve the silver dye bleach method by employing azo dyes containing an aliphatic chain of at least 8 carbon atoms linked to the diazonium portion of the dye.

It is a further object of the present invention to produce photographic emulsions for the silver dye bleach method involving the employment of azo dyes which do not diffuse from the emulsions due to the presence therein of a long aliphatic chain located in the diazonium portion of the dye.

Other and further important objects of the invention will become apparent as the description proceeds.

The primary amines which are diazotized according to the present invention to produce the azo dyes may be represented by the following structural formula:

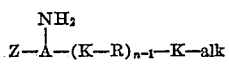

wherein Z is a conventional substituent such as hydrogen alkyl, i. e., methyl, ethyl, propyl, butyl, and the like; alkoxy, such as methoxy, ethoxy, and the like; sulfo, carboxy; halogen such as chlorine, bromine, etc.; K is a homopolar linkage such as a carbonamide linkage, a sulfonamide linkage, a carbamyl linkage, a sulfamyl linkage or an ether linkage; alk represents an aliphatic chain of at least 8 carbon atoms; R is an aromatic radical, i. e., phenyl, toluyl and the like, $n$ equals 1 or 2, and A is a phenyl or aminodiphenyl radical.

Examples of the primary amines contemplated herein are the following:

1. 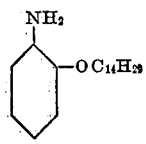

2-tetradecoxyaniline 2. 2-octadecoxyaniline.
3. 2-dodecoxyaniline.
4. 2-decoxyaniline.

5. 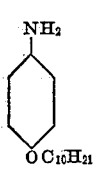

4-decoxyaniline 6. 4-octoxyaniline.
7. 4-dodecoxyaniline.
8. 4-tetradecoxyaniline.
9. 4-octadecoxyaniline.

10. 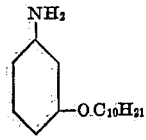

3-decoxyaniline 11. 3-tetradecoxyaniline.

12. 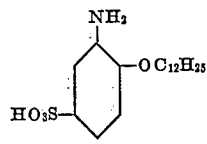

2-dodecoxyaniline-5-sulfonic acid 13. 2-decoxyaniline-5-sulfonic acid.
14. 2-tetradecoxyaniline-5-sulfonic acid.
15. 2-octadecoxyaniline-5-sulfonic acid.

16. 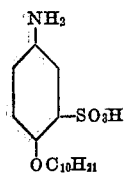

4-decoxyaniline-3-sulfonic acid 17. 4-tetradecoxyaniline-3-sulfonic acid.

18. 4-octadecoxyaniline-3-sulfonic acid.
19. 3-tetradecoxyaniline-6-sulfonic acid.

20. 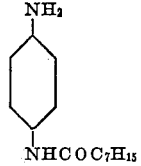

4-amino caprylanilide (or 4-caprylamido aniline)

21. 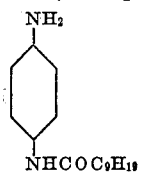

4-amino-capranilide 22. 4-aminolauranilide.
23. 4-aminomyristanilide.
24. 4-aminostearanilide.

25. 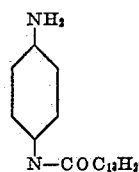

4-amino-N'-methylmyristanilide

26. 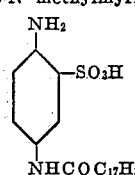

5-stearamido orthanilic acid

27. 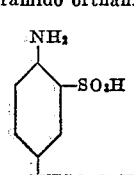

5-octadecanesulfonamido orthanilic acid

28. 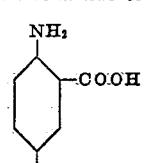

5-lauramido anthranilic acid

29. 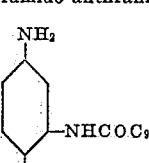

3-amino-6-methoxycapranilide

30. 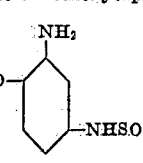

3-amino-4-methoxydodecanesulfonanilide

31. 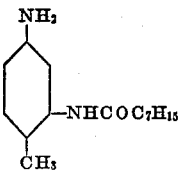
3-amino-6-methylcaprylanilide

32. 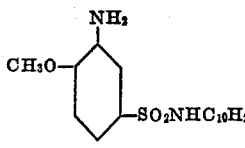
4-amino-2-methyl tetradecanesulfonanilide

33. 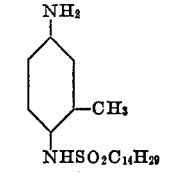
4-methyl-5-stearamido metanilic acid

34. 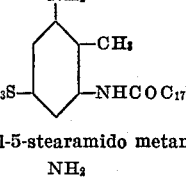
4-amino-N'-decylbenzamide 35. 4-amino-N'-dodecylbenzamide.

36. 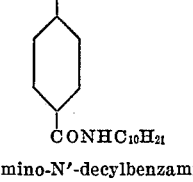
3-amino-N'-dodecylbenzamide

37. 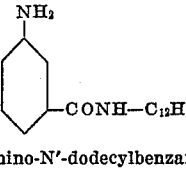
3-amino-N'.N'-dioctylbenzamide 38. 3-amino-N'-methyl-N'-dodecylbenzamide.

39. 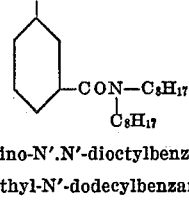
N'-dodecylsulfanilamide

40. 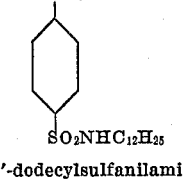
N'-N'-dioctylsulfanilamide

41. 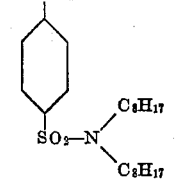
N'-tetradecylmetanilamide

42. 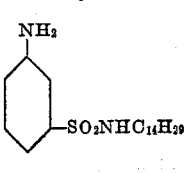
4-methoxy-N'-decylmetanilamide 43. 4-methoxy-N'-methyl-N'-decyl metanilamide.

44. 4-methyl-N'-octylmetanilamide.

45. 
4-lauramido-3'-aminobenzenesulfonanilide

46. 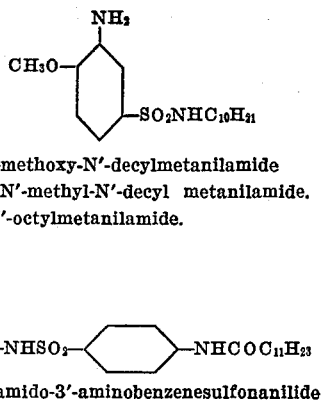
4-dodecoxy-3'-aminobenzenesulfon-p-anisidide

47. 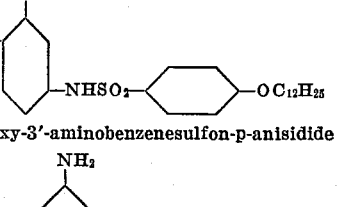
N'-caprylylsulfanilamide

48. N'-laurylsulfanilamide.

49. N'-myristylsulfanilamide.

50. N'-methyl-N'-laurylsulfanilamide.

51. 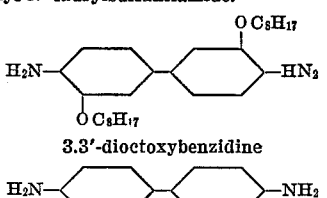
3.3'-dioctoxybenzidine

52. 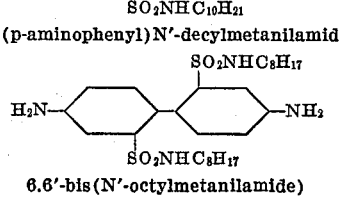
6-(p-aminophenyl)N'-decylmetanilamide

53. 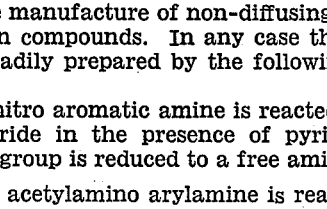
6.6'-bis(N'-octylmetanilamide)

Many of the primary amines contemplated for use in the manufacture of non-diffusing azo dyes are known compounds. In any case the amines can be readily prepared by the following methods:

(1) A nitro aromatic amine is reacted with an acyl chloride in the presence of pyridine and the nitro group is reduced to a free amino group.

(2) An acetylamino arylamine is reacted with a sulfonyl chloride in the presence of pyridine and the acetyl group is hydrolyzed to yield a free amino group.

(3) A nitro aromatic acyl chloride is reacted with a long chain aliphatic amine and the nitro group reduced to a free amino group.

(4) An acetylamino aromatic sulfonyl chloride is reacted with a long chain aliphatic amine and the acetyl group hydrolyzed to a free amino group.

(5) An acetylamino phenol is reacted with an alkyl bromide and the acetyl group hydrolyzed to a free amino group. If desired the resulting product may be sulfonated with strong sulfuric acid for the purpose of introducing a sulfonic acid group.

Aromatic amines suitable for use in the first reaction are:

3-nitro-aniline
4-nitro-aniline
4-nitro-N-methyl-aniline
3-nitro-6-methoxy-aniline
3-nitro-4-ethoxy-aniline
2-chloro-4-nitro-aniline
3-nitro-4-chloro-5-methoxy-aniline
3-nitro-5-methyl-aniline
2-methyl-4-nitro-aniline
6-nitro-metanilic acid
2-nitro-5-amino-benzoic acid
5-nitro-4-methyl-metanilic acid.

Acyl chlorides suitable for use in the first reaction are:

Caprylic acid chloride
Capric acid chloride
Lauric acid chloride
Myristic acid chloride
Palmitic acid chloride
Stearic acid chloride
Octyl sulfonyl chloride
Decyl sulfonyl chloride
Dodecyl sulfonyl chloride
Tetradecyl sulfonyl chloride
Octadecyl sulfonyl chloride and the like.

Aromatic amines suitable for use in the second reaction are 4-acetylamino aniline, 3-acetyl-amino-aniline, and the like.

The sulfonyl chlorides listed above may be utilized with such amines to produce the products of the second reaction.

Suitable nitro acyl chlorides for effectuating the third reaction are: 3-nitro-benzoyl chloride, 4-nitro-benzoyl-chloride, 3-nitrobenzene-sulfonyl chloride, 3-nitro-4-methoxy-benzene sulfonyl chloride, and the like.

Suitable amines for utilization with said acyl chlorides are N,N-dioctylamine, octyl amine, nonyl amine, decyl amine, dodecyl amine, tetradecyl amine, octadecylamine, and the like.

Sulfonyl chlorides suitable for the fourth reaction are: 4-acetylamino-benzene sulfonylchloride, and the like. Said sulfonyl chlorides may be used with the aliphatic amines listed above.

Suitable acetylamino phenols for utilization in the fifth reaction are: 2-hydroxy-acetanilide, 4-hydroxy-acetanilide, 3-hydroxy-acetanilide, and the like.

The alkyl bromides with which said phenols are to be reacted may be taken from the group of octyl bromide, decyl bromide, undecyl bromide, dodecyl bromide, tetradecyl bromide, octadecyl bromide, and the like.

The coupling components usually employed in the preparation of azo dyes for use in the silver dye bleach process may be employed with the diazonium compounds from the aforementioned primary amines to produce the dyes of the present invention It is, of course, understood that no coupling component will be employed which contains a radical preventing diffusion of the dye from a photographic emulsion since such coupling components after cleavage of the dye may leave colored bodies in the emulsion.

Examples of coupling components which have been found to be eminently suitable are the naphthols, such as β-naphthol, H-acid, R-acid, G-acid, acylamino H-acids, such as acetyl-H-acid, benzoyl H-acid, benzene sulfonyl H-acid, and the like, and the pyrazolones such as 1-phenyl-3-methyl-pyrazolone, 1-phenyl-3-carboxy-5-pyrazolone, 1-(4'-sulfo phenyl)-3-carboxy-5-pyrazolone, 1(3'-sulfo phenyl)-3-carb-ethoxy-5-pyrazolone, and the like.

The naphthol type of coupler, it has been found, generally yields magenta dyes. On the other hand, yellow dyes are produced from the pyrazolones. If it be desired to produce cyan dyes, it is necessary to use the above primary amines in the formation of bis- or tris- azo dyes. This may be accomplished, for instance, by diazotizing one of the aforementioned primary amines, coupling the same with, for instance, a naphthylamine, diazotizing the resulting product, and coupling the same with a naphthol, such as one of the aforementioned acyl H-acids. Examples of suitable naphthylamines are: 1-amino naphthylamine-6-sulfonic acid, 1-amino-2-methoxy naphthylamine-6-sulfonic acid, and the like.

The azo dyes produced as above used in the customary way to produce film for the azo dye bleach process, with the very important exception that no precipitant is needed to bind the dyes in their respective emulsions. Thus it is only necessary to incorporate a non-diffusing dye in the properly sensitized emulsion, cast the emulsion and dry the same.

The processing of the film is also conventional, involving the usual steps of exposing and developing the dyed emulsions and discharging the dyes at the silver images with a bleach bath. In the bleaching step, the coupling component cleaved from the dye discharges into the bleach bath, whereas the amine with the long aliphatic chain remains in the emulsion. Since the amine is colorless and stable, it has no deleterious effect on the film.

As previously pointed out, the azo dyes made with the diazonium compound containing a non-diffusing group are also eminently suitable for use in the production of integral masking images by following the general procedure of U. S. application Serial No. 533,833, filed May 3, 1944, by H. H. Duerr et al. As a matter of fact, by utilizing the azo dyes containing a long aliphatic chain on the diazonium portion thereof, the process of said application has been made commercially available since the process may be practiced without the loss of sensitivity attributable to the presence in the emulsion layers of dye precipitating agents.

The following examples will serve to illustrate the invention, but it is to be understood that the invention is not restricted thereto.

PREPARATION OF THE PRIMARY DIAZOTIZABLE AMINES

*Example 1*

A solution of 66.4 grams (.44 mol) of 2-hydroxy-acetanilide and 110.8 grams (.4 mol) of tetra decyl bromide in 600 cc. of boiling absolute alcohol is treated with a solution of 10.2 grams (.44 mol) of sodium metal in 200 cc. of absolute ethyl alcohol and the whole is heated under reflux for 5 hours. The precipitated sodium bromide is removed by filtration and the filtrate is poured into 2 liters of water containing 10 cc. of concentrated hydrochloric acid. The 2-tetradecoxy acetanilide which separates is removed by filtration.

The moist 2-tetradecoxy-acetanilide is dissolved in 600 cc. of absolute ethyl alcohol, treated with a solution of 100 grams of potassium hydroxide in 100 cc. of water, and the whole heated under reflux for 15 hours. The solution is poured into 2 liters of water containing sufficient hydrochloric acid to form the hydrochloride of the hydrolyzed product (pH=approximately 2). The solid which separates is removed by filtration and redissolved in 500 cc. of absolute ethyl alcohol. The alcoholic solution is treated with boneblack and then poured into 1000 cc. of water containing 100 cc. of hydrochloric acid. The 2-tetradecoxyaniline hydrochloride is removed by filtration, washed well with water and air-dried. The melting point of the product is 131 to 132° C.

10 grams of the hydrochloride is dissolved in 25 cc. of warm ethyl alcohol, treated with boneblack and filtered. The filtrate was poured into 80 cc. of water containing 10 cc. of 40% sodium hydroxide solution. The precipitated material is extracted with ether, the extract is dried over "Drierite" and the ether removed by distillation. There is obtained 7 grams of 2-tetradecoxy aniline, melting at 40–42° C.

The procedure is the same as above excepting that the tetradecyl bromide is replaced by octadecyl bromide. The resulting product is 2-octadecoxy-aniline.

The procedure is the same as above excepting that the tetradecyl bromide is replaced by dodecyl bromide. The product obtained is 2-dodecoxy-aniline.

The procedure is the same as above excepting that the tetradecyl bromide is replaced by decyl bromide. The product obtained is 2-decoxy-aniline.

Example 2

To a mixture of 25 grams of 4-hydroxy-acetanilide and 32 grams of decyl bromide in 300 cc. of absolute ethyl alcohol is added a solution of 3.9 grams of sodium metal in 90 cc. of absolute ethyl alcohol. The solution is heated under reflux for 4 hours and the precipitated sodium bromide removed by filtration. The filtrate is poured into 1 liter of water containing 5 cc. of concentrated hydrochloric acid. The 4-decoxy-acetanilide is removed by filtration, washed with water, digested with 5% sodium hydroxide, and again washed with water.

The moist 4-decoxy-acetanilide is dissolved in 300 cc. of absolute ethyl alcohol, treated with 100 grams of 50% potassium hydroxide solution, and the whole heated under reflux for 8 hours. The solution is poured into 1 liter of water containing 150 cc. of 6-N sulfuric acid. The solid which separates is removed by filtration, washed with dilute sulfuric acid and finally with water.

The 4-decoxy-aniline sulfate thus obtained is dissolved in 100 cc. of warm isopropyl alcohol, treated with boneblack and filtered. The filtrate is poured into 300 cc. of water containing 300 cc. of 40% sodium hydroxide solution. The precipitated material is extracted with ether and the ether removed by distillation. The product, which melts at 48–50° C., is 4-decoxy-aniline.

The procedure is the same as above excepting that the decyl bromide is replaced by octyl bromide. The product obtained is 4-octoxy-aniline.

The procedure is the same as above excepting that the decyl bromide is replaced by dodecyl bromide to yield 4-dodecoxy-aniline.

The procedure is the same as above excepting that the decyl bromide is replaced by tetradecyl bromide to yield 4-tetradecoxy-aniline.

The procedure is the same as above excepting that the decyl bromide is replaced by octadecyl bromide yielding 4-octadecoxy-aniline.

Example 3

The procedure is the same as in the first preparation of Example 2 excepting that the 4-hydroxy-acetanilide is replaced by 3-hydroxy-acetanilide. The product resulting is 3-decoxy-aniline.

The procedure is the same as in the first preparation of Example 1 excepting that 2-hydroxy-acetanilide is replaced by 3-hydroxy-acetanilide. The product obtained is 3-tetradecoxy-aniline.

Example 4

To a cooled mixture of 38 grams of 2-dodecoxy-aniline prepared as above in 80 cc. of concentrated sulfuric acid is added 60 cc. of 25% oleum and the whole is heated at 60–65° C. for 12 minutes. A solubility test with sodium bicarbonate solution indicates completion of the sulfonation. The reaction mixture is cooled and poured onto ice. The white solid is removed by filtration, washed with water, and while still moist heated for 10 minutes with 1000 cc. of isopropanol. The suspension is cooled and the hot material removed by filtration and dried in an oven at 50° C. The resulting product is 2-dodecoxy-aniline-5-sulfonic acid (4-dodecoxy-metanilic acid).

The procedure is the same as above excepting that the dodecoxy-aniline is replaced by decoxy-aniline to yield 2-decoxy-aniline-5-sulfonic acid.

The procedure is the same as above excepting that the 2-dodecoxy-aniline is replaced by 2-tetradecoxy-aniline to yield 2-tertradecoxy-aniline-5-sulfonic acid.

The procedure is the same as above excepting that the 2-dodecoxy-aniline is replaced by 2-octadecoxy-aniline to yield 2-octadecoxy-aniline-5-sulfonic acid.

Example 5

30 grams of finely powdered 4-decoxy-aniline are added by stirring to a mixture of 150 grams of concentrated sulfuric acid and 150 grams of 20% oleum at 25° C. After the reaction mixture has been agitated for 1 hour at 25° C., the temperature is raised to 50–55° C. and maintained thereat for 10 minutes. The cooled solution is poured onto ice water and the precipitate, which separates, is removed by filtration and washed with water. The wet product is digested 3 times with 100 cc. portions of ethyl alcohol and finally dried in an oven at 50° C. The product is 4-decoxy-aniline-3-sulfonic acid (6-decoxy-metanilic acid).

The procedure is the same as above excepting that the 4-decoxy-aniline is replaced by 4-tetradecoxy-aniline.

The procedure is the same as above excepting that the 4-decoxy-aniline is replaced by 4-octadecoxy-aniline.

Example 6

A suspension of 18.6 grams of 3-tetradecoxy-aniline in 93 cc. of concentrated sulfuric acid is heated on a steam bath for 10 minutes. The mixture is poured onto ice and the solid which separates is removed by filtration and washed with water. The wet product is digested 3 times with 100 cc. portions of boiling ethyl alcohol and is finally dried in an oven at 50° C. The product obtained is 3-tetradecoxy-aniline-6-sulfonic acid (4-tetradecoxy-orthanilic acid).

Example 7

4-nitroaniline was heated with lauric acid chloride in pyridine to convert the 4-nitro-aniline into 4-nitro-lauranilide. The 4-nitro-lauranilide is then reduced with iron and acetic acid in ethyl alcohol according to the general method of Roth and Burkhardt (Ber. 73, p. 701 [1940]). The resulting product is 4-aminolauranilide.

*Example 8*

3-acetamido-benzenesulfonic acid is nitrated according to the method of Eger (Ber. 21, p. 2581 [1888]) to produce 6-nitrometanilic acid. 6-nitrometanilic acid is then heated with stearoyl chloride in pyridine and the nitro group of the resulting product is reduced with iron filings in acetic acid. The resulting product is 5-stearamido orthanilic acid.

*Example 9* p-Toluenesulfonyl chloride is nitrated to 3,5-dinitro-p-toluene sulfonic acid according to the method of Reverdin and Crepieux (Ber. 34, p. 2995 [1901]). One of the nitro groups is selectively reduced with ammonium sulfide according to the method of Marckwald (Ann. 274, p. 350 [1893]). The resulting 4-methyl-5-nitrometanilic acid is converted by means of stearoyl chloride in pyridine to 3-stearamido-5-nitro-p-toluene sulfonic acid. The remaining nitro group is then reduced with iron and acetic acid to 4-methyl-5-stearamidometanilic acid. The course of the reaction is represented as follows:

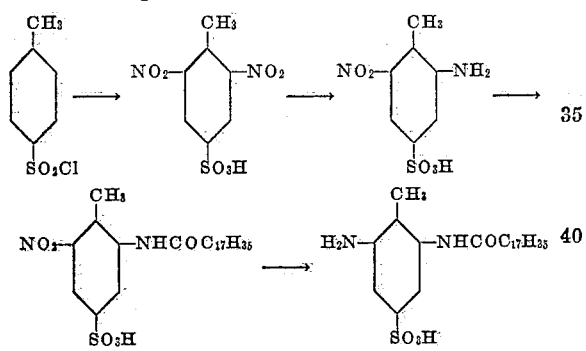

*Example 10*

3-nitro-benzoyl chloride is treated with dodecyl amine and sodium hydrogen carbonate in ether solution and the resulting 3-nitro-N-dodecyl benzamide (M. P. 83° C.) is reduced with iron and acetic acid in ethyl alcohol to yield 3-amino-N-dodecyl benzamide (M. P. 57° C.).

*Example 11* p-Acetamido-benzene sulfonyl chloride is converted to p-acetamido-benzene-N-dodecyl-sulfonamide by reaction with dodecyl amine. The acetyl group is removed by alkaline hydrolysis according to the method of Crossley, Northey and Hultquist, JACS 62, page 532 (1940) to give p-aminobenzene-N-dodecyl-sulfonamide.

PREPARATION OF NON-DIFFUSING AZO DYES

*Example 12*

A suspension of 3.5 grams of 2-dodecoxy-aniline hydrochloride in 2.5 cc. of concentrated hydrochloric acid and 20 cc. of water is diazotized with .9 gram of sodium nitrite in 5 cc. of water. An additional 60 cc. of water are added to completely dissolve the diazonium salt. The solution is agitated for 1½ hours in an ice bath and the excess nitrous acid destroyed with sulfamic acid.

The diazonium salt solution is slowly added at 5° C. to a solution of 5.6 grams of benzoyl-H-acid and 6 grams of sodium carbonate in 35 cc. of water and the whole agitated for 2 hours. After the mixture has been acidified with hydrochloric acid and treated with saturated sodium chloride solution, the precipitated azo dye is removed by filtration. The dye is purified by reprecipitating it from its aqueous solution. The dried material is separated from the sodium chloride by extraction with dimethyl formamide. After removal of the solvent in vacuo, the dye is digested several times with acetone and finally air dried.

The dyestuff has the following formula:

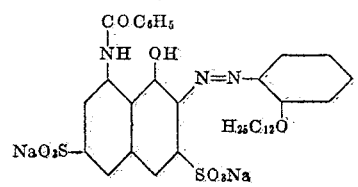

A similar dye is prepared by replacing the 2-dodecoxy-aniline hydrochloride in the above preparation by 2-tetradecoxy-aniline hydrochloride.

*Example 13*

The procedure is the same as in Example 12 excepting that the benzoyl H-acid is replaced by acetyl H-acid.

A similar dye is obtained by coupling acetyl H-acid with the diazo from 2-tetradecoxy-aniline rather than that from 2-decoxy-aniline.

*Example 14*

The procedure is the same as in Example 12 excepting that the benzoyl-H-acid is replaced by benzenesulfonyl H-acid. The dyestuff obtained has the following formula:

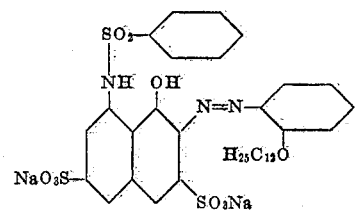

Similar dyes are obtained by coupling benzenesulfonyl H-acid to diazotized 2-decoxy-aniline and diazotized 2-tetradecoxy-aniline.

*Example 15*

The procedure is the same as in Example 12 excepting that the benzoyl H-acid is replaced by 1-(4'-sulfophenyl)-3-carboxy-5-pyrazolone. The dye obtained has the following formula:

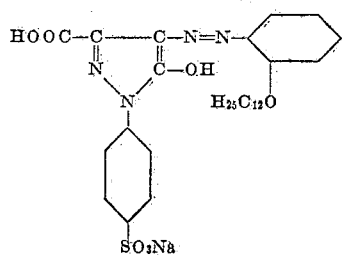

Similar dyes are obtained when coupling the aforementioned pyrazolone with diazotized 2-decoxy-aniline and diazotized 2-tetradecoxy-aniline.

*Example 16*

A solution of 4.4 grams of 2-octadecoxy-aniline-5-sulfonic acid and 10 cc. of 2-N sodium carbonate solution in 100 cc. of water is treated with a solution of .75 gram of sodium nitrite in 10 cc.

of water and the whole slowly added at 5° C. to a well-agitated solution of 4 cc. of concentrated hydrochloric acid in 50 cc. of water. The mixture is agitated for 1 hour and the excess nitrous acid is then destroyed with sulfamic acid. The diazonium salt suspension is slowly added at 5° C. to a solution of 5.6 grams of benzoyl-H-acid, 7 grams of sodium carbonate and 30 cc. of water and the whole agitated for 5 hours. After the mixture has been acidified with hydrochloric acid and treated with 15% aqueous sodium chloride solution, the precipitated dye is removed by filtration. The dye is purified by reprecipitating it from aqueous solution. The dried material is separated from the sodium chloride by means of an extraction with dimethylformamide. After removal of the solvent in vacuo, the residue is digested several times with acetone and finally air dried.

The dyestuff has the following formula:

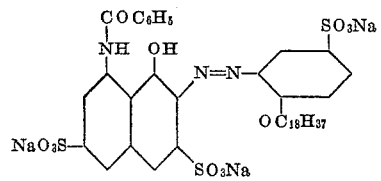

Similar dyes are obtained when coupling benzoyl H-acid with diazotized 2-decoxy-aniline-5-sulfonic acid, 2-dodecoxy-aniline-5-sulfonic acid and 2-tetradecoxy-aniline-5-sulfonic acid respectively.

Example 17

2-octadecoxy-aniline-5-sulfonic acid is diazotized as above and coupled with 1-(3'-sulfophenyl)-3-carbethoxy-5-pyrazolone. The resulting product has the following formula:

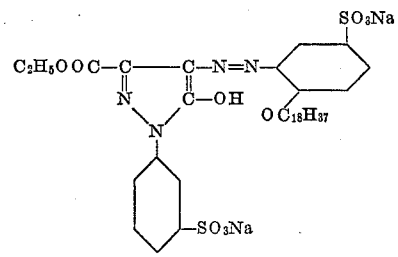

Example 18

A suspension of 2.9 grams of 4-lauramido-aniline (prepared as above) in 2.5 ml. of hydrochloric acid and 30 ml. of water is treated at 5° C. with a solution of .7 gram of sodium nitrite in 5 ml. of water. The whole is added slowly to an agitated solution of 4.6 grams of benzoyl H-acid and 6 grams of sodium carbonate in 40 ml. of water. After 12 hours stirring the product is precipitated by addition of hydrochloric acid and salt. The dye is re-dissolved in water and precipitated with salt. It is then extracted from the dry solid with dimethyl formamide, the solvent removed in vacuo, and the residue digested with acetone to remove all traces of dimethylformamide. The resulting dye, which has the following formula:

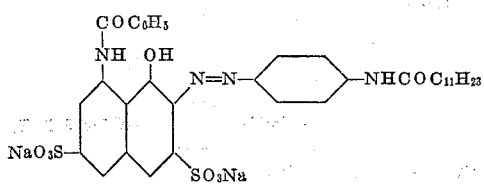

gives a magenta color in aqueous solution.

Example 19

4-lauramido-aniline is diazotized as in Example 18 and coupled with 3.1 grams of 1-(3'-sulfophenyl)-3-carbethoxy-5-pyrazolone dissolved in 75 ml. of water containing 6 grams of sodium carbonate. The reaction mixture is stirred for 12 hours and the product is precipitated after acidification, with salt. The latter is eliminated by extraction of the dye with dimethylformamide. After removal of the solvent in vacuo and digestion with acetone, a bright yellow dye is obtained, said dye having the following formula:

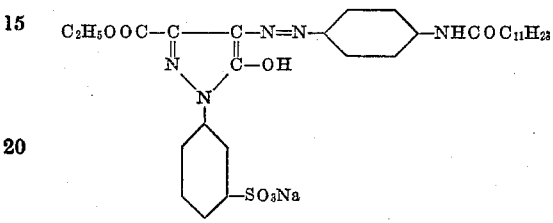

Example 20

To a solution of 4.6 grams of 5-stearamido-orthanilic acid, 1.1 gram of sodium carbonate and 10 ml. of ethanol in 50 ml. of water is added .77 gram of sodium nitrite dissolved in 5 ml. of water, and the whole is added slowly to an agitated mixture of 6 ml. of concentrated hydrochloric acid, 8 ml. of water, and 30 grams of ice. After stirring 1 hour in the cold, the excess nitrous acid is destroyed with sulfamic acid and the diazo suspension is added portionwise to an agitated solution (5–10° C.) of 5.0 grams of benzenesulfonyl H-acid in 50 ml. of water containing 10 grams of sodium carbonate. The reaction mixture is stirred at room temperature for 16 hours and then the dye is precipitated by acidification and addition of salt. The dye is purified by solution in water and reprecipitation with salt. Admixed salt was eliminated by extraction of the dye with dimethylformamide. After removal of the solvent under diminished pressure and a thorough acetone wash, the dye is obtained as a dark red solid which gives a deep magenta color in aqueous solution, said dye having the following formula:

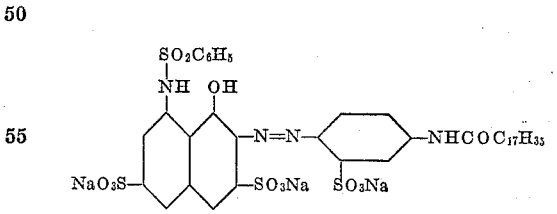

Example 21

The diazonium suspension obtained from 4.6 grams of 5-stearamido-orthanilic acid (as in the previous example) is coupled with 2.8 grams of 1-(3'-sulfophenyl)-3-carbethoxy-5-pyrazolone dissolved in 140 ml. of water containing 10 grams of sodium carbonate. The product is separated after 18 hours stirring by acidification and addition of salt. It is dissolved in warm water, reprecipitated by salt, and separated by centrifugation. When dry, the dye is extracted from the mixture of dye and salt by the use of dimethylformamide. Distillation of the solvent and digestion of the residue with acetone leaves a bright yellow dye, said dye having the following formula:

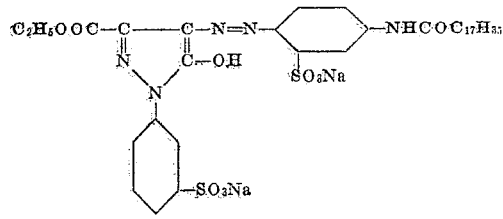

Example 22

A solution of 4.7 grams of 4-methyl-5-stearamido-metanilic acid, 0.4 gram of sodium hydroxide, .77 gram of sodium nitrite, and 10 ml. of ethanol in 50 ml. of water is added to a cold, well-agitated mixture of 6 ml. of concentrated hydrochloric acid, 8 ml. of water, and sufficient ice to maintain the temperature at 0–8° C. After 2 hours stirring and the destruction of any excess nitrous acid with sulfamic acid, the diazo suspension is added portionwise with stirring to a cold solution of 4.6 grams of benzoyl H-acid in 15 ml. of pyridine and 25 ml. of concentrated ammonium hydroxide. After stirring for 24 hours at room temperature, the reaction mixture is acidified with hydrochloric acid and treated with 50 ml. of 30% salt solution to precipitate the dye. The filtered dye is redissolved in 400 ml. of warm water and salted out with 50 grams of salt. After drying at 55° C., the dye is extracted with dimethylformamide, the solvent removed in vacuo, and the residue washed thoroughly with acetone. A magenta dye was obtained, said dye having the following formula:

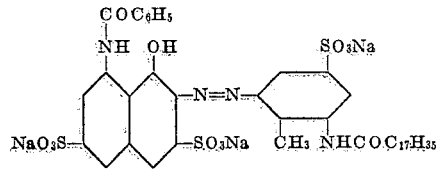

Example 23

The diazonium salt prepared from 4.7 grams of 4-methyl-5-stearamido-metanilic acid (see preceding example) is coupled with 2.8 grams of 1 - (3' - sulfophenyl) -3-carbethoxy-5-pyrazolone in a solution of 7 grams of sodium carbonate in 140 ml. of water. After 18 hours stirring at room temperature, the dye is salted out and removed by filtration. Solution in water, followed by acidification and addition of salt, gives a pure dye contaminated only with salt. The latter is eliminated by extraction of the dye with dimethylformamide. The solvent is removed in vacuo and the residue washed well with acetone. Aqueous solutions of the dye are bright yellow, said dye having the formula:

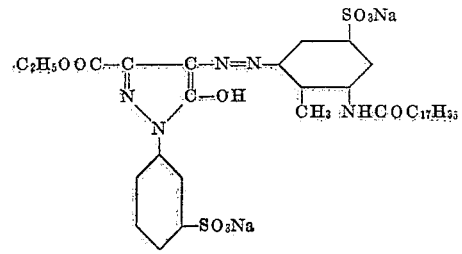

Example 24

To a cold, agitated mixture of 3 grams of 3-amino-N-dodecylbenzamide, 3 ml. of concentrated hydrochloric acid and 7 ml. of water is added a solution of 0.7 gram of sodium nitrite in 5 ml. of water. The diazonium salt thus produced is added portionwise with agitation to a cold solution of 5 grams of benzenesulfonyl H-acid in 40 ml. of water containing 6 grams of sodium carbonate. After 12 hours stirring at room temperature, the dye is precipitated with salt, dissolved in water, the solution acidified, and the dye salted out completed. After oven drying, the dye is extracted with dimethylformamide, the solvent removed by vacuum distillation, and the residue washed thoroughly with acetone. The dye thus obtained gives a magenta colored aqueous solution, said dye having the following formula:

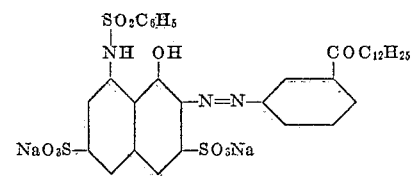

Example 25

Diazotized 3-amino-N-dodecylbenzamide (see preceding example for procedure) is coupled with a cold, agitated solution of 3.1 grams of 1-(3'-sulfophenyl)-3-carbethoxy-5-pyrazolone in 75 ml. of water containing 6 grams of sodium carbonate. After 12 hours stirring, the reaction mixture is acidified with hydrochloric acid and precipitation of the dye completed by addition of salt. The dye, after purification and removal of salt (dimethylformamide method) is a bright yellow in color, said dye having the following formula:

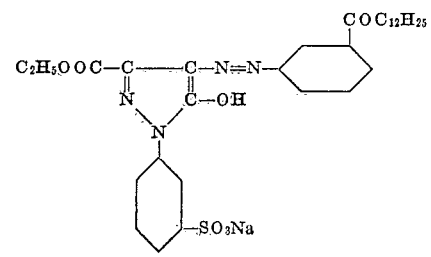

Example 26

A solution of 3.4 grams of p-aminobenzene-N-dodecyl sulfonamide in 10 ml. of ethyl alcohol and 2.5 ml. of hydrochloric acid is treated in the cold with 0.7 gram of sodium nitrite dissolved in 5 ml. of water. The whole is added portionwise at 0–5° C. to an agitated solution of 4.6 grams of benzoyl H-acid and 6 grams of sodium carbonate in 40 ml. of water. After 10 hours stirring the reaction mixture is acidified with hydrochloric acid and precipitation of the product completed by addition of solid salt. The dye is redissolved in water and precipitated with salt. After oven drying, the dye is taken up in dimethylformamide and the solvent removed in vacuo. An acetone wash of the residue leaves a bright magneta dye, said dye having the following formula:

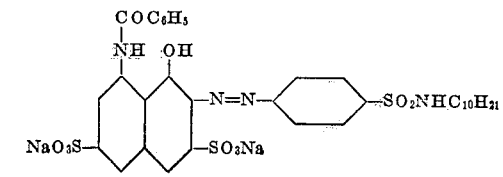

Example 27

One-tenth mol of diazotized p-aminobenzene-N-dodecylsulfonamide (prepared as in preceding example) is coupled in the cold with 3.1 grams of 1-(3'-sulfophenyl) 3-carbethoxy-5-pyrazolone dissolved in 75 ml. of water containing 6 grams of sodium carbonate. After 12 hours stirring, the dye is salted out and purified by precipitation from aqueous solution with salt. A dimethylformamide extraction freed the product from salt, and vacuum distillation of the solvent leaves a yellow dye, said dye having the following formula:

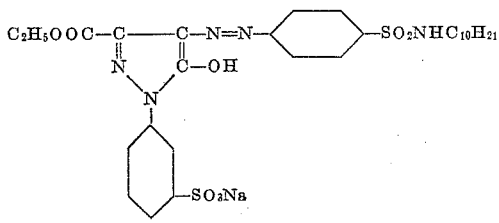

Example 28

*Part (a).*—A solution of 13.5 grams (0.38 mol) of 2-dodecoxyaniline-5-sulfonic acid in 40 cc. of 2-N-sodium hydroxide and 60 cc. of water is treated with 2.7 grams of sodium nitrite, and the whole is slowly added at 0 to 5° C. to a well agitated solution of 15 cc. of concentrated hydrochloric acid in 15 cc. of water. The diazonium salt solution is agitated for ½ hour and the excess nitrous acid destroyed with sulfamic acid.

*Part (b).*—A suspension of 10 grams (.04 mol) of 1-amino-2-ethoxy-naphthalene-6-sulfonic acid in 50 cc. of water is treated with sodium carbonate solution until an alkaline solution is obtained. 45 grams of sodium acetate are added and the mixture acidified with acetic acid until it is acid to litmus.

*Part (c).*—Part (b) is added at 5° C. to Part (a) and the coupling reaction is allowed to proceed at 0 to 5° C. for 36 hours. The reaction mixture is acidified with hydrochloric acid to Congo red and the precipitate which separates is removed by filtration.

*Part (d).*—A suspension of the azo compound of Part (c) and 80 cc. of cold water is treated with 2-N-sodium carbonate until an alkaline solution is obtained. 3.4 grams of sodium nitrite are added and the whole added slowly to a well agitated solution of 20 cc. of concentrated hydrochloric acid and 11 grams of sodium chloride in 110 cc. of water. During the addition which is carried out over a period of 30 minutes, there is likewise added 80 grams of sodium chloride. After agitating the mixture for 2 hours at 5 to 10° C., the brown solid which precipitates is removed by filtration and washed with a 5% sodium chloride solution.

*Part (e).*—The diazonium salt from Part (d) is gradually added at 5 to 10° C. with good agitation to a solution of 17.5 grams of benzoyl H-acid in 50 cc. of 29% ammonium hydroxide. The dye is purified by reprecipitating it from its aqueous solution with hydrochloric acid. The dried material is separated from sodium chloride by extraction with dimethylformamide. After removal of the solvent in vacuo the dye is digested with acetone and air dried. It dissolved in water with a greenish-blue color and had the following formula:

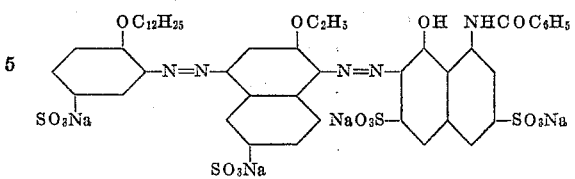

Example 29

5 cc. of a 2% aqueous solution of the dyestuff obtained by coupling diazotized 2-dodecoxyaniline-5-sulfonic acid with benzoyl H-acid is added to 25 grams of a sensitized silver bromide emulsion and the mixture coated on a film base, dried, exposed and processed by the silver dye bleach method while utilizing as the bleaching bath a composition containing the following ingredients:

| | |
|---|---|
| Potassium iodide | grams 10 |
| Sodium hypophosphite | do 5 |
| Quinoline | do 50 |
| Sulfuric acid | cubic centimeters 75 |
| Water | do 1000 |

There remains a brilliant magenta dyestuff image, the film having no yellow cast as it does when coupling components containing a non-diffusing group are employed.

Example 30

The procedure is the same as in Example 29 excepting there is used the dyestuff obtained by diazotization of 2-decoxy-aniline and the coupling of the diazonium salt with 1-(4'-sulfophenyl)-3-carboxy-5-pyrazolone. After processing the film, there remains a bright yellow dyestuff image.

Any of the other dyes specifically described above may be substituted for the dyes of the preceding examples.

Example 31

25 grams of a silver halide emulsion sensitized for red and containing 5 cc. of a 2% solution of the dyestuff prepared as in Example 28 are cast on a film base. Over this layer there is cast 25 grams of 2% gelatin. On the gelatin layer there is cast 25 grams of a green sensitive silver halide emulsion in which has been incorporated 5 cc. of a 2% solution of the magenta azo dye prepared from diazotized 2-octadecoxyaniline-5-sulfonic acid and benzoyl H-acid. Over this layer there is cast 25 grams of 2% gelatin, and over this layer a colloidal silver filter layer. Over the colloidal silver filter layer, there is cast another layer comprising 25 grams of 2% gelatin, and then as an outer layer 25 grams of a silver halide emulsion not specially sensitized, having incorporated therein 5 cc. of a 2% solution of the yellow azo dye derived from diazotized 2-octadecoxyaniline-5-sulfonic acid and 1-(3-sulfophenyl)-3-carboxy-5-pyrazolone.

The multilayer material thus constituted is exposed and developed for 5 minutes at 20° C. in a developer constituted as follows:

| | |
|---|---|
| Hot water (52° C.) | cubic centimeters 750 |
| Metol | grams 1.5 |
| Sodium sulfite, anhydrous | do 45 |
| Sodium bisulfite | do 1 |
| Hydroquinone | do 3 |
| Sodium carbonate, monohydrated | do 6 |
| Potassium bromide | do .8 |
| Water to make 1 liter | |

After development, the film is treated for 5 minutes with a shortstop and fixing bath prepared from the following solutions:

SOLUTION 1

Hot water (52° C.) _____ cubic centimeters __ 500
Hypo _____ grams __ 240

SOLUTION 2

Hot water (52° C.) _____ cubic centimeters __ 150
Sodium sulfite, anhydrous _____ grams __ 15
Acetic acid (28%) _____ cubic centimeters __ 45
Potassium alum _____ grams __ 15

Solution 2 is added to Solution 1 and diluted to 1 liter by the addition of distilled water. The film is next washed for 5 minutes and then hardened with a composition consisting of:

Sodium bicarbonate _____ grams __ 10
Formalin (30%) _____ cubic centimeters __ 25
Water _____ liters __ 1

The film is washed for 2 minutes and then is subjected to the action of an azo dye bleach solution consisting of:

Potassium iodide _____ grams __ 10
Sodium hypophosphite _____ do ____ 5
Quinoline _____ do ____ 50
Sulfuric acid _____ cubic centimeters __ 75
Water _____ liters __ 1

After the bleaching step, the film is washed for 5 minutes and then treated for 5 to 10 minutes with a silver bleaching bath consisting of:

Copper sulfate _____ grams __ 100
Potassium bromide _____ do ____ 100
Hydrochloric acid _____ cubic centimeters __ 10
Water _____ liters __ 1

The film is then washed for 3 minutes and fixed with the fixing composition given above for 5 minutes and finally washed. There results a subtractively colored print in which each of the yellow, magenta and cyan images is intensely colored, the film being free of any color distortion.

*Example 32*

The yellow dye of Example 23 is incorporated in the green sensitive layer, and a mixture of the magenta dye of Example 16 and the yellow dye of Example 23 (combination gives a red color) is incorporated in the red sensitive layer of a multilayer Ansco type negative color film. After development of the negative silver and azo-methine dye images, the incorporated azo dyes are bleached imagewise in situ with silver images according to the teachings of U. S. application Serial No. 533,833. Positive yellow and red color correction masks in combination with the negative magenta and cyan azo-methine color images are produced in the green sensitive and red sensitive layers, respectively.

I claim:

1. A silver halide emulsion for use in the silver azo dye bleach process containing an azo dye fast to diffusion therein, the diazonium portion of said azo dye being derived from a primary aromatic amine of the following formula $$Z-A-(K-R)_{\overline{n-1}}-K-alk$$
$$NH_2$$

wherein A is selected from the class consisting of a phenyl and an amino diphenyl radical, Z is selected from the class consisting of hydrogen, alkyl, alkoxy, halogen, sulfo and carboxy, K is a homopolar linkage selected from the class consisting of an ether linkage, a carbonamide linkage, a carbamyl linkage, a sulfonamide linkage and a sulfamyl linkage, alk represents an aliphatic chain of at least 8 carbon atoms, R is a phenyl radical and $n$ equals a positive whole number not greater than 2.

2. The composition as defined in claim 1 wherein the azo dye contains a naphthol as the coupling component.

3. The composition as defined in claim 1 wherein the azo dye contains as the coupling component an acylamino naphthol polysulfonic acid.

4. The composition as defined in claim 1 wherein the azo dye contains as the coupling component a 1-phenyl-5-pyrazolone.

5. The composition as defined in claim 1 wherein the homopolar linkage is an ether linkage.

6. In a multilayer photographic material for use in the silver azo dye bleach method, a red sensitive silver halide emulsion on the base containing a cyan azo dye of the formula:

7. In a multilayer photographic material for use in the silver azo dye bleach method, a green sensitive silver halide emulsion containing a nondiffusing magenta azo dye of the following formula:

8. In a multilayer photographic material for use in the silver azo dye bleach method, a blue sensitive silver halide emulsion containing a nondiffusing yellow azo dye of the following formula:

JOSEPH A. SPRUNG.

REFERENCES CITED

The following references are of record in the file of this patent:

UNITED STATES PATENTS

| Number | Name | Date |
|---|---|---|
| 1,517,049 | Christensen | Nov. 25, 1924 |
| 2,020,775 | Gaspar | Nov. 12, 1935 |
| 2,186,731 | Schneider | Jan. 9, 1940 |
| 2,193,931 | Michaelis | Mar. 19, 1940 |
| 2,376,822 | Schneider | May 22, 1945 |
| 2,431,996 | Duerr et al. | Dec. 2, 1947 |
| 2,449,966 | Hanson | Sept. 21, 1948 |
| 2,464,798 | Duerr et al. | Mar. 22, 1949 |

FOREIGN PATENTS

| Number | Country | Date |
|---|---|---|
| 481,274 | Great Britain | Mar. 8, 1938 |